(12) United States Patent
Kelly et al.

(10) Patent No.: US 10,152,393 B2
(45) Date of Patent: Dec. 11, 2018

(54) OUT-OF-BAND DATA RECOVERY IN COMPUTING SYSTEMS

(71) Applicant: Microsoft Technology Licensing, LLC, Redmond, WA (US)

(72) Inventors: Bryan Kelly, Carnation, WA (US); Mallik Bulusu, Bellevue, WA (US); Ali Hassan Larijani, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 15/249,422

(22) Filed: Aug. 28, 2016

(65) Prior Publication Data

US 2018/0060231 A1    Mar. 1, 2018

(51) Int. Cl.
G06F 11/00 (2006.01)
G06F 11/14 (2006.01)
G06F 9/4401 (2018.01)

(52) U.S. Cl.
CPC ...... *G06F 11/1471* (2013.01); *G06F 11/1441* (2013.01); *G06F 9/4418* (2013.01)

(58) Field of Classification Search
CPC combination set(s) only.
See application file for complete search history.

(56) References Cited

U.S. PATENT DOCUMENTS 6,336,174 B1 * 1/2002 Li .................. G06F 11/1441
                                                365/228
6,631,478 B1 * 10/2003 Wang ............... G06F 11/1471
                                                714/15
7,047,462 B2    5/2006 Brown et al.
7,594,144 B2    9/2009 Brandyberry et al.
7,827,442 B2   11/2010 Sharma et al.
8,417,774 B2    4/2013 Flynn et al.
(Continued)

FOREIGN PATENT DOCUMENTS

CN    101661421 A    3/2010
CN    102130951 A    7/2011
(Continued)

OTHER PUBLICATIONS

Narayanan et al. "Whole-System Persistence", 2012, ASPLOS'12.*
(Continued)

*Primary Examiner* — Gabriel Chu
(74) *Attorney, Agent, or Firm* — Liang IP, PLLC

(57) ABSTRACT

Embodiments of recovering data in computing devices and associated methods of operations are disclosed therein. In one embodiment, a method includes receiving a failure notification indicating that a core of a main processor is experiencing a catastrophic failure causing the core unable to execute instructions. In response, a flush command can be issued to an uncore of the processor via a debug port instructing the uncore to copy any data currently residing in a processor cache of the main processor to a volatile memory. The method further includes issuing a self-refresh command causing the volatile memory to enter a self-refresh mode in which the data copied from the processor cache is maintained and unmodifiable by the main processor during a reset of the main processor.

20 Claims, 10 Drawing Sheets

(56) References Cited

U.S. PATENT DOCUMENTS

| | | |
|---|---|---|
| 8,661,306 B2 | 2/2014 | Zhang |
| 8,856,600 B2 | 10/2014 | Zadigian et al. |
| 9,703,346 B2 * | 7/2017 | Mudusuru .................. G06F 1/30 |
| 9,779,016 B1 * | 10/2017 | Shen .................... G06F 11/1456 |
| 2005/0044453 A1 * | 2/2005 | Dunstan ..................... G06F 1/30 |
| | | 714/43 |
| 2006/0136765 A1 * | 6/2006 | Poisner ............... G06F 11/1441 |
| | | 713/323 |
| 2006/0139069 A1 * | 6/2006 | Frank ........................ G06F 1/30 |
| | | 327/143 |
| 2008/0270776 A1 * | 10/2008 | Totolos ............... G06F 11/1441 |
| | | 713/1 |
| 2008/0270827 A1 | 10/2008 | Brandyberry et al. |
| 2015/0370302 A1 * | 12/2015 | Mudusuru ................. G06F 1/30 |
| | | 711/103 |
| 2016/0179667 A1 * | 6/2016 | Kumar ................ G06F 12/0804 |
| | | 711/135 |
| 2016/0378344 A1 * | 12/2016 | Nachimuthu ........... G06F 3/065 |
| | | 711/103 |

FOREIGN PATENT DOCUMENTS

| | | |
|---|---|---|
| CN | 103970565 A | 8/2014 |
| CN | 104486419 A | 4/2015 |

OTHER PUBLICATIONS

"JTAG-based Embedded Debugger diagnoses Intel® x86 systems", Published on: Apr. 6, 2011 Available at: http://news.thomasnet.com/fullstory/jtag-based-embedded-debugger-diagnoses-intel-x86-systems-594092.

* cited by examiner

OUT-OF-BAND DATA RECOVERY IN COMPUTING SYSTEMS

BACKGROUND

Servers in cloud computing datacenters can utilize non-volatile dual in-line memory modules ("NVDIMMs") or other types of hybrid memory devices to achieve high application performance, data integrity, and rapid system recovery. Certain types of NVDIMMs (e.g., NVDIMM-Ns) can include a dynamic random access memory ("DRAM") module operatively coupled to a flash memory module. The DRAM module allows fast memory access while the flash memory module can persistently retain data upon unexpected power losses, system crashes, or normal system shutdowns.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though NVDIMM-Ns can provide fast memory access and persistently retain data upon unexpected power loses, NVDIMM-Ns are typically a lot more expensive than regular DRAM modules. As such, a computing device can be implemented with software NVDIMMs ("NVDIMM-SWs") to emulate functions of the NVDIMM-Ns with a main memory and persistent storage of the computing device. For example, a portion of the main memory and the persistent storage can be designated as a volatile memory and a non-volatile memory of an NVDIMM-SW. During a power failure or normal shutdown, by executing routines with a main processor, the computing device can copy or "flush" data residing in the designated portion of the main memory to the persistent storage via a peripheral component interconnect express ("PCIE") bus on a motherboard by utilizing a battery or other suitable backup power sources.

In normal operation, the main processor can execute instructions to process, modify, or otherwise manipulate data. Typically, to maximize throughput, the main processor writes processed data to an integrated processor cache (e.g., L1 and L2 cache) without immediately transferring the data to the main memory. The data in the processor cache can later be written to the main memory and subsequently saved into the persistent storage of the NVDIMM-SW to ensure "freshness" of the data through "out of battery," "system reset," or other suitable system operations.

The foregoing data storage operations of NVDIMM-SWs depend on the main processor being capable of executing instructions. However, when the main processor experiences a catastrophic failure, the foregoing cache flush operation may not be completed properly. For example, the main processor can experience high operating temperatures, software conflicts, or other significant errors. As a result, the main processor can stop executing instructions and "hang." As such, data currently in the processor cache can be lost when the main processor is reset during which the processor cache is re-initiated. Such incomplete cache flush can lead to data integrity issues. Thus, one challenge of implementing NVDIMM-SWs is to prevent or at least reduce such data loss when the main processor experiences catastrophic failures.

Several embodiments of the disclosed technology can address at least certain aspects of the foregoing challenge by implementing an out-of-band data recovery scheme via a debug port of the main processor. In certain embodiments, the main processor can include one or more logic processors referred to as "cores" configured to execute machine instructions. Each core can include, for example, one or more arithmetic logic units, floating-point units, and L1 and L2 cache. The main processor can also include a set of peripheral components configured to facilitate operations of the cores. Such peripheral components are commonly referred to collectively as an "uncore". For example, an uncore can include QuickPath® Interconnect controllers, L3 cache, snoop agent pipeline, or other suitable elements. The uncore can also include a debug port allowing out-of-band access to various parts of the cores and uncore. For example, a programmer/developer can monitor or adjust operations of the cores and uncore by issuing commands via the debug port without affecting execution of machine instructions by the cores.

In certain implementations, a baseboard management controller ("BMC") can be configured to communicate with the uncore on the main processor via the debug port to effect out-of-band processor cache flush when the main processor experiences a catastrophic failure. In certain implementations, when the cores of the main processor experience a catastrophic failure and hang, the uncore or other suitable components of the main processor can signal the catastrophic failure to the BMC via, for example, a designated pin of the BMC. In response, the BMC can issue a flush command to the uncore to flush any data still in the processor cache to the main memory. Once the data flush to the main memory is completed, the BMC can issue a self-refresh command to the main processor and/or a memory controller to place into self-refresh the portion of the main memory containing the flushed data. The BMC can also write to a log file in the persistent storage indicating the catastrophic failure. The log file is accessible by a basic input/output system ("BIOS"), operating system, or other suitable components of the computing device.

The BMC can then issue a reset command to the uncore via the debug port to reset the cores of the main processor. During reset, the BIOS, operating system, or other suitable components of the computing device can access the log file in the persistent storage to determine whether the reset is caused by a previous catastrophic failure of the cores. If the reset is caused by a previous catastrophic failure, the computing device can restore the flushed data from the portion of the main memory to the processor cache without re-initializing the portion of the main memory. As such, data previously residing in the processor cache during a catastrophic failure can be recovered even when the cores of the main processor are hang. In other implementations, the foregoing operations can be facilitated by a rack controller, an enclosure controller, or other suitable types of controller instead of or in lieu of the BMC.

DETAILED DESCRIPTION

Figure 1:
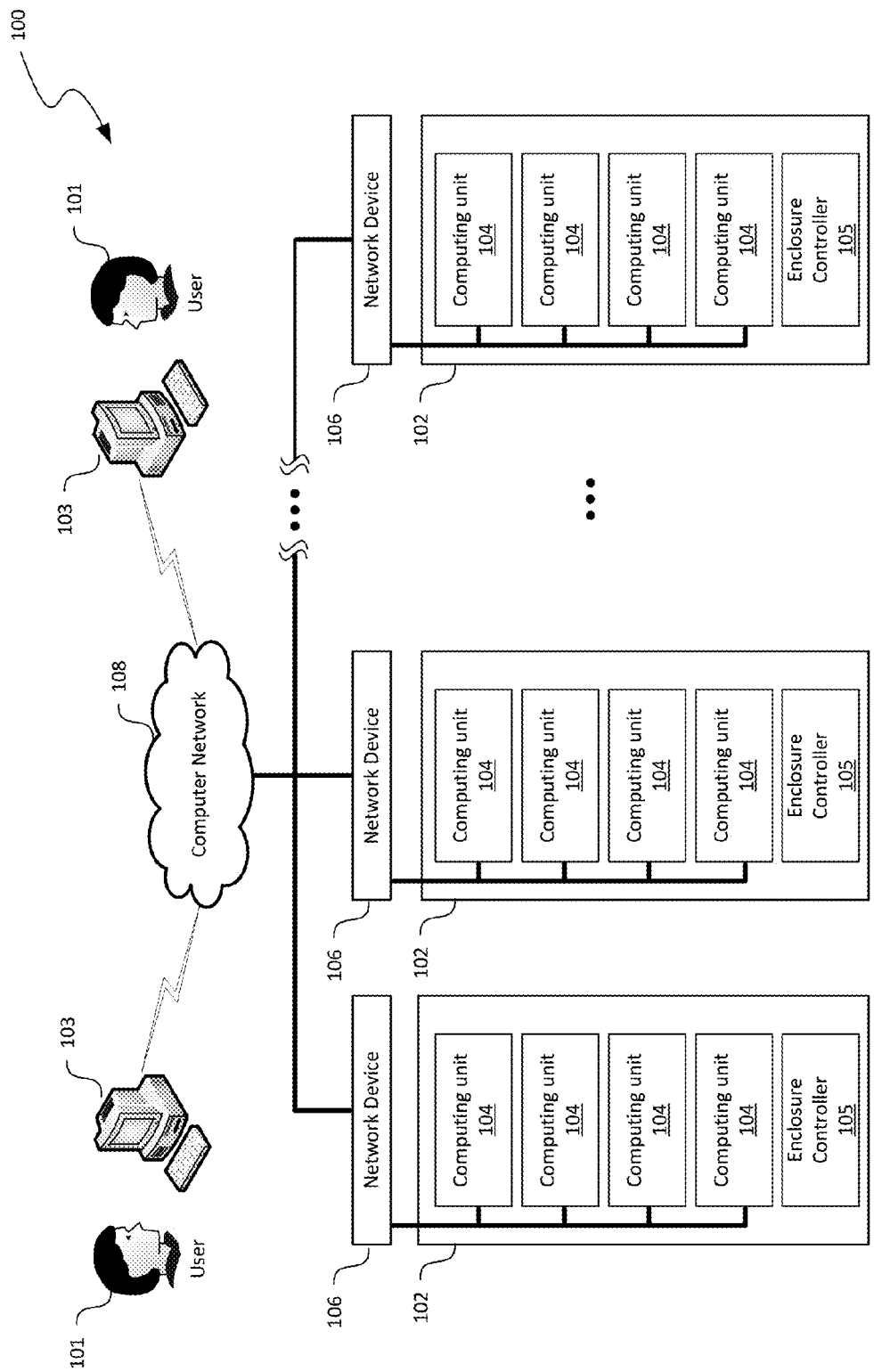
FIG. 1 is a schematic block diagram illustrating a computing system having computing units configured in accordance with embodiments of the present technology.

Various embodiments of computing systems, devices, components, modules, routines, and processes related to out-of-band data recovery in computing devices are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-7.

As used herein, the term "volatile memory" generally refers to a computer memory that requires power to maintain stored data. One example volatile memory is DRAM, which can retain stored data when powered via refreshing. When power is removed or interrupted, DRAM modules can lose stored data within minutes due to a lack of refreshing. In contrast, the term "non-volatile memory" generally refers to a computer memory that can retain stored data even without power. Examples of non-volatile memory include read-only memory ("ROM"), flash memory (e.g., NAND or NOR solid state drives or SSDs), and magnetic storage devices (e.g. hard disk drives or HDDs).

Also used herein, the term "hybrid memory device" generally refers to a computer memory device that includes one or more volatile memory modules and non-volatile memory modules operatively coupled to one another. In certain embodiments, a hybrid memory device can be a single hardware module (e.g., NVDIMM-Ns) having a volatile memory, a non-volatile memory, and a memory controller interconnected with one another. The hybrid memory device can have an external data bus and corresponding logic to be configured as a randomly addressable memory ("RAM") module. Example RAM modules include DIMMs (Dual Inline Memory Modules), JEDEC (Joint Electron Device Engineering Council) DDR SDRAM, and modules configured according to other suitable RAM specifications. The one or more non-volatile memory devices can be primarily or exclusively used to facilitate or ensure that certain data in the volatile memory modules appears to be persistent. As such, data in the volatile memory modules can be persisted when power is unexpectedly interrupted or during normal shutdowns.

In other embodiments, a hybrid memory device can be software implemented in a computing device having a main processor, a main memory, and a persistent storage coupled to one another via a data bus on a motherboard. The main memory can include DRAMs or other suitable volatile memory devices. The persistent storage can include SSDs, HDDS, or other suitable non-volatile memory devices. In certain implementations, certain memory blocks in the main memory can be designated as NVDIMM-SWs. During a power interruption or normal shutdown, the main processor can execute certain instructions in, for instance, BIOS of the computing device to flush data residing in the designated memory blocks of the main memory to the persistent storage using power from a battery, a capacitor, or other suitable backup power sources. Upon a system reset, the persisted data in the persistent storage can be restored in the designated memory blocks of the main memory.

Also used herein, the term "main processor" generally refers to an electronic package containing various components configured to perform arithmetic, logical, control, and/or input/output operations. The electronic package can include one or more "cores" configured to execute machine instructions. The cores can individually include one or more arithmetic logic units, floating-point units, L1 and L2 cache, and/or other suitable components. The electronic package can also include one or more peripheral components referred to as "uncore" configured to facilitate operations of the cores. The uncore can include, for example, QuickPath® Interconnect controllers, L3 cache, snoop agent pipeline, and/or other suitable components. In the descriptions herein, L1, L2, and L3 cache are collectively referred to as "processor cache."

Also used herein, the term "debug port" generally refers to an access module allowing an external entity to access certain features of and/or execute certain commands in cores and/or uncore of a main processor. An example debug port can be a test access port implemented according to IEEE1149.1-1990 standard, the disclosure of which is incorporated herein in its entirety. Such a debug portion can allow a debugger (e.g., a developer) to execute a reset command in the main processor to cause the main processor to perform a designed reset sequence. In other examples, the debugger can also perform read/write data directly from/to a processor cache, code download, single stepping, processor status monitoring, and other suitable actions in the main processor. Thus, the debugger can access and monitor various parts of the main processor in order to discover hardware/software errors in the main processor. In certain embodiments, the debug port can be configured to communicate with the debugger via pins. For example, IBM 403 family processors use such pins for a debug port in addition to pins for reset, power sense, and ground. In other embodiments, the debug port can be configured to communicate with the debugger via traces, cables, or other suitable connectors.

In network servers, desktop computers, laptop computers, tablets, or other computing devices, a main processor can execute instructions of applications to process, modify, or otherwise manipulate data representing state information of the executed applications. Typically, the main processor writes such data to an integrated processor cache (e.g., L1 and L2 cache) without immediately transferring the data to a main memory. In certain embodiments, the data in the processor cache can later be written to a portion of the main memory designated as a volatile memory of an NVDIMM-SW and subsequently persisted to a persistent storage designated as a non-volatile memory of the NVDIMM-SW to ensure data persistence through "out of battery," "system reboot," or other suitable operations.

The foregoing data operations depend on proper functioning of the cores of the main processor. For example, flushing the data from the processor cache to the main memory and from the main memory to the persistent storage both depend on the main processor executing certain instructions. However, the main processor can sometimes experience catastrophic failures that render the main processor hang. For example, the main processor can hang due to high operating temperatures, software conflicts, or other significant errors. As used herein, the term "catastrophic failure" generally refers to a failure of the main processor (or other components of a computing device) that renders the main processor unable to execute machine instructions to perform designed functions. When the main processor experiences such catastrophic failures, the foregoing operations may not be completed properly. As a result, data in the processor cache can be lost when the main processor is reset.

Several embodiments of the disclosed technology can address at least certain aspects of the foregoing challenge by implementing an out-of-band data recovery scheme via a debug port of the main processor. In certain embodiments, an external controller (e.g., a BMC) can detect a catastrophic failure of the main processor. In response, the external controller can command the uncore of the main processor to copy any data still residing in the processor cache to a portion of the main memory designated as an NVDIMM-SW. The external controller can also generate a log entry or log file accessible by a BIOS or operating system of the computing device. As such, during a reset, the BIOS or operating system can recognize that a catastrophic failure occurred prior to the reset. Based on such recognition, the BIOS or operating system can be configured to restore the data in the main memory to the processor cache while the portion of the main memory holding the flushed data is maintained by not undergoing re-initialization during reset. The BIOS or operating system can recognize that the computing device has experienced a self-refresh reset using, for example, registers holding values that can persist through a warm/soft reset of the processor core(s). The data in the main memory can then be restored to the processor cache. As such, data in the processor cache can be recovered via an out-of-band communication channel to the main processor. Additional examples and embodiments of the disclosed technology are described in more detail below with reference to FIGS. 1-7.

FIG. 1 is a schematic block diagram illustrating a computing system 100 having computing units 104 configured in accordance with embodiments of the present technology. As shown in FIG. 1, the computing system 100 can include multiple computer enclosures 102 individually housing computing units 104 interconnected by a computer network 108 via network devices 106. The computer network 108 can also be configured to interconnect the individual computing units 104 with one or more client devices 103. Even though particular configurations of the computing system 100 are shown in FIG. 1, in other embodiments, the computing system 100 can also include additional and/or different components than those shown in FIG. 1.

The computer enclosures 102 can include structures with suitable shapes and sizes to house the computing units 104. For example, the computer enclosures 102 can include racks, drawers, containers, cabinets, and/or other suitable assemblies. In the illustrated embodiment of FIG. 1, four computing units 104 are shown in each computer enclosure 102 for illustration purposes. In other embodiments, individual computer enclosures 102 can also include ten, twenty, or any other suitable number of computing units 104. In further embodiments, the individual computer enclosures 102 can also include power distribution units, fans, intercoolers, and/or other suitable electrical and/or mechanical components (not shown).

The computing units 104 can individually include one or more servers, network storage devices, network communications devices, or other suitable computing devices suitable for datacenters or other computing facilities. In certain embodiments, the computing units 104 can be configured to implement one or more cloud computing applications and/or services accessible by user 101 using the client device 103 (e.g., a desktop computer, a smartphone, etc.) via the computer network 108. The computing units 104 can individually include one or more software implemented hybrid memory devices 120 (shown in FIGS. 2A-2E) and can be configured to implement out-of-band data recovery in accordance with embodiments of the disclosed technology, as described in more detail below with reference to FIGS. 2A-2E.

As shown in FIG. 1, the individual computer enclosures 102 can also include an enclosure controller 105 configured to monitor and/or control a device operation of the computing units 104, power distribution units, fans, intercoolers, and/or other suitable electrical and/or mechanical components. For example, the enclosure controllers 105 can power up, power down, reset, power cycle, refresh, and/or perform other suitable device operations on a particular computing unit 104 in a computer enclosure 102. In certain embodiments, the individual enclosure controllers 105 can include a rack controller configured to monitor operational status of the computing units 104 housed in a rack. One suitable rack controller is the Smart Rack Controller (EMX) provided by Raritan of Somerset, N.J. In other embodiments, the individual enclosure controllers 105 can include a cabinet controller, a container controller, or other suitable types of controller.

In the illustrated embodiment, the enclosure controllers 105 individually include a standalone server or other suitable types of computing device located in a corresponding computer enclosure 102. In other embodiments, the enclosure controllers 105 can include a service of an operating system or application running on one or more of the computing units 104 in the individual computer enclosures 102. In further embodiments, the in the individual computer enclosures 102 can also include remote server coupled to the computing units 104 via an external network (not shown) and/or the computer network 108.

In certain embodiments, the computer network 108 can include twisted pair, coaxial, untwisted pair, optic fiber, and/or other suitable hardwire communication media, routers, switches, and/or other suitable network devices. In other embodiments, the computer network 108 can also include a wireless communication medium. In further embodiments, the computer network 108 can include a combination of hardwire and wireless communication media. The computer network 108 can operate according to Ethernet, token ring, asynchronous transfer mode, and/or other suitable link layer protocols. In the illustrated embodiment, the computing units 104 in the individual computer enclosure 102 are coupled to the computer network 108 via the network devices 106 (e.g., a top-of-rack switch) individually associated with one of the computer enclosures 102. In other embodiments, the computer network 108 may include other suitable topologies, devices, components, and/or arrangements.

In operation, the computing units 104 can receive requests from the users 101 using the client device 103 via the computer network 108. For example, the user 101 can request a web search using the client device 103. After receiving the request, one or more of the computing units 104 can perform the requested web search and generate relevant search results. The computing units 104 can then transmit the generated search results as network data to the client devices 103 via the computer network 108 and/or other external networks (e.g., the Internet, not shown). As described in more detail below with reference to FIGS. 2A-2E, the individual computing units 104 can include one or more software implemented hybrid memory devices 120, and can implement out-of-band data recovery in accordance with embodiments of the disclosed technology.

Figure 2A:
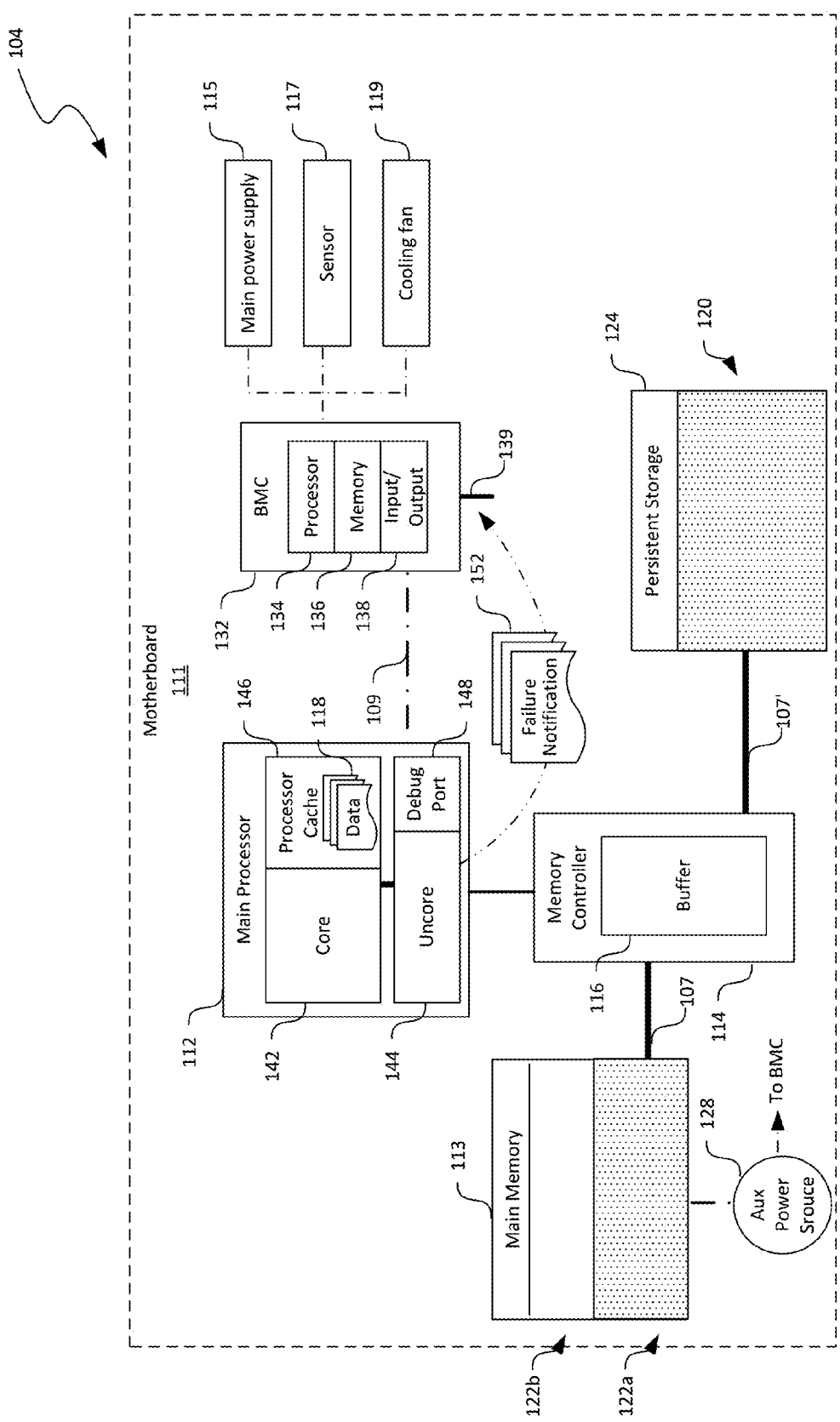
FIGS. 2A-2E are schematic block diagrams of a computing unit suitable for the computing system of FIG. 1 at various operational stages in accordance with embodiments of the present technology.

FIGS. 2A-2E are schematic block diagrams of a computing unit 104 suitable for the computing system 100 in FIG. 1 at various operational stages in accordance with embodiments of the disclosed technology. In particular, FIGS. 2A-2E illustrate various operational stage of the computing unit 104 during a catastrophic failure of a main processor of the computing unit 104. Details of the various operational stages are described below in turn. As shown in FIG. 2A, the computing unit 104 can include a motherboard 111 carrying a main processor 112, a main memory 113, a memory controller 114, a persistent storage 124, an auxiliary power source 128, and a BMC 132 operatively coupled to one another. The motherboard 111 can also carry a main power supply 115, a sensor 117 (e.g., a temperature or humidity sensor), and a cooling fan 119 (collectively referred to as "peripheral devices") coupled to the BMC 132.

Though FIGS. 2A-2E only show the motherboard 111 in phantom lines, the motherboard 111 can include a printed circuit board with one or more sockets configured to receive the foregoing or other suitable components described herein. In other embodiments, the motherboard 111 can also carry indicators (e.g., light emitting diodes), communication components (e.g., a network interface module), platform controller hubs, complex programmable logic devices, and/or other suitable mechanical and/or electric components in lieu of or in addition to the components shown in FIGS. 2A-2E.

In further embodiments, the motherboard 111 can be configured as a computer assembly or subassembly having only portions of those components shown in FIGS. 2A-2E. For example, the motherboard 111 can form a computer assembly containing only the main processor 112, main memory 113, and the BMC 132 without the persistent storage 124 being received in a corresponding socket. In other embodiments, the motherboard 111 can also be configured as another computer assembly with only the BMC 132. In further embodiments, the motherboard 111 can be configured as other suitable types of computer assembly with suitable components.

The main processor 112 can be configured to execute instructions of one or more computer programs by performing arithmetic, logical, control, and/or input/output operations, for example, in response to a user request received from the client device 103 (FIG. 1). As shown in FIG. 2A, the main processor 112 can include a core 142 having a processor cache 146, an uncore 144 operatively coupled to one another. Even though only one core 142 is shown in FIG. 2A, in other embodiments, the main processor 112 can include two, three, or any suitable number of cores operating in parallel, serial, or in other suitable fashions. In FIG. 2A and other figures herein, the processor cache 146 (e.g., L1 and L2 cache) is shown as a component of the core 142 for illustration purposes. In other embodiments, the processor cache 146 can also include a portion (e.g., L3 cache) integrated with the uncore 144. In other embodiments, the processor cache 146 can also include other suitable types of memory elements in other suitable arrangements.

As shown in FIG. 2A, the uncore 144 can include a debug port 148 operatively coupled to the BMC 132 via a debug bus 109. The debug port 148 can include circuits or electronic modules configured to allow the uncore 144 to receive certain instructions from the BMC 132. By executing the received instructions, the uncore 144 can effect out-of-band data backup or persistence from the process cache, as described in more detail below.

The main memory 113 can include a digital storage circuit directly accessible by the main processor 112 via, for example, a data bus 107. In one embodiment, the data bus 107 can include an inter-integrated circuit bus or I$^2$C bus as detailed by NXP Semiconductors N.V. of Eindhoven, the Netherlands. In other embodiments, the data bus 107 can also include a PCIE bus, system management bus, RS-232, small computer system interface bus, or other suitable types of control and/or communications bus. In certain embodiments, the main memory 113 can include one or more DRAM modules. In other embodiments, the main memory 113 can also include magnetic core memory or other suitable types of memory. The persistent storage 124 can include one or more non-volatile memory devices operatively coupled to the memory controller 114 via another data bus 107' (e.g., a PCIE bus). For example, the persistent storage 124 can include an SSD, HDD, or other suitable storage components.

As shown in FIG. 2A, the computing unit 104 can implement a software based NVDIMM using at least a portion of the main memory 113 and the persistent storage 124. For example, in certain embodiments, a first portion 122a of the main memory 113 can be designated as an NVDIMM-SW 120 such that any data 118 residing in the NVDIMM-SW 120 can be automatically backed up and persisted in the persistent storage 124 facilitated by the main processor 112. A second portion 122b of the main memory 113 can be designated, for example, by default to be a volatile memory such that any data in the second portion 122b is lost during a power failure or normal shutdown. In other embodiments, the entire main memory 113 can be designed as an NVDIMM-SW. Even though the main memory 113 is shown as a separate component from the persistent storage 124 in FIG. 2A, in further embodiments, the main memory 113 and the persistent storage 124 can be integrated into a single module, or have other suitable configurations.

Also shown in FIG. 2A, the main processor 112 can be coupled to a memory controller 114 having a buffer 116. The memory controller 114 can include a digital circuit that is configured to monitor and manage operations of the main memory 113 and the persistent storage 124. For example, in one embodiment, the memory controller 114 can be configured to periodically refresh the main memory 113. In another example, the memory controller 114 can also continuously, periodically, or in other suitable manners transmit or "write" data 118b (shown in FIG. 2C) in the buffer 116 to the main memory 113 and/or the persistent storage 124. In the illustrated embodiment, the memory controller 114 is separate from the main processor 112. In other embodiments, the memory controller 114 can also include a digital circuit or chip integrated into a package containing the main processor 112, for example, as a part of the uncore 144. One example memory controller is the Intel® 5100 memory controller provided by the Intel Corporation of Santa Clara, Calif.

The BMC 132 can be configured to monitor operating conditions and control device operations of various components on the motherboard 111. As shown in FIG. 2A, the BMC 132 can include a processor 134, a memory 136, and an input/output component 138 operatively coupled to one another. The processor 134 can include one or more microprocessors, field-programmable gate arrays, and/or other suitable logic devices. The memory 136 can include volatile and/or nonvolatile computer readable media (e.g., ROM, RAM, magnetic disk storage media, optical storage media, flash memory devices, EEPROM, and/or other suitable non-transitory storage media) configured to store data received from, as well as instructions for, the processor 136.

In one embodiment, both the data and instructions are stored in one computer readable medium. In other embodiments, the data may be stored in one medium (e.g., RAM), and the instructions may be stored in a different medium (e.g., EEPROM). The input/output component 124 can include a digital and/or analog input/output interface configured to accept input from and/or provide output to other components of the BMC 132. One example BMC is the Pilot 3 controller provided by Avago Technologies of Irvine, Calif.

As shown in FIG. 2A, the BMC 132 can include a pin 139 configured to receive a signal representing a failure notification 152 from the main processor 112. In certain embodiments, the signal to the pin 139 can be activated by applying a voltage to the pin 139. In other embodiments, the signal can be activated by applying a current or other suitable types of input to the pin 139. In response to the received signal, the processor 134 of the BMC 132 can execute certain instructions in the memory 136 to effect out-of-band data recovery from the processor cache 146, as described in more detail below.

The auxiliary power source 128 can be configured to controllably provide an alternative power source (e.g., 12-volt DC) to the NVDIMM-SW 120, the main processor 112, the memory controller 114, and other components of the computing unit 104 in lieu of the main power supply 115. In the illustrated embodiment, the auxiliary power source 128 includes a power supply that is separate from the main power supply 115. In other embodiments, the auxiliary power source 128 can also be an integral part of the main power supply 115. In further embodiments, the auxiliary power source 128 can include a capacitor sized to contain sufficient power to write all data from the portion 122 of the main memory 113 to the persistent storage 124. As shown in FIG. 2A, the BMC 132 can monitor and control operations of the auxiliary power source 128, as described in more detail below.

The peripheral devices can provide input to as well as receive instructions from the BMC 132 via the input/output component 138. For example, the main power supply 115 can provide power status, running time, wattage, and/or other suitable information to the BMC 132. In response, the BMC 132 can provide instructions to the main power supply 115 to power up, power down, reset, power cycle, refresh, and/or other suitable power operations. In another example, the cooling fan 119 can provide fan status to the BMC 132 and accept instructions to start, stop, speed up, slow down, and/or other suitable fan operations based on, for example, a temperature reading from the sensor 117. In further embodiments, the motherboard 111 may include additional and/or different peripheral devices.

FIG. 2A shows an operating stage in which the main processor 112 experiences a catastrophic failure that causes the core 142 to hang. In response to detecting the catastrophic failure, the uncore 144 can transmit a failure notification 152 to the BMC 132 by, for example, activating a signal on the pin 139 via an electrical circuit (e.g., a trace) on the motherboard 111. As shown in FIG. 2A, when the core 142 experiences the catastrophic failure, certain data 118 still resides in the processor cache 146. As described in more detail below, the BMC 132 can be configured to instruct the uncore 144 to flush the data 118 from the processor cache 146 to the first portion 122a of the main memory 113.

Figure 2B:
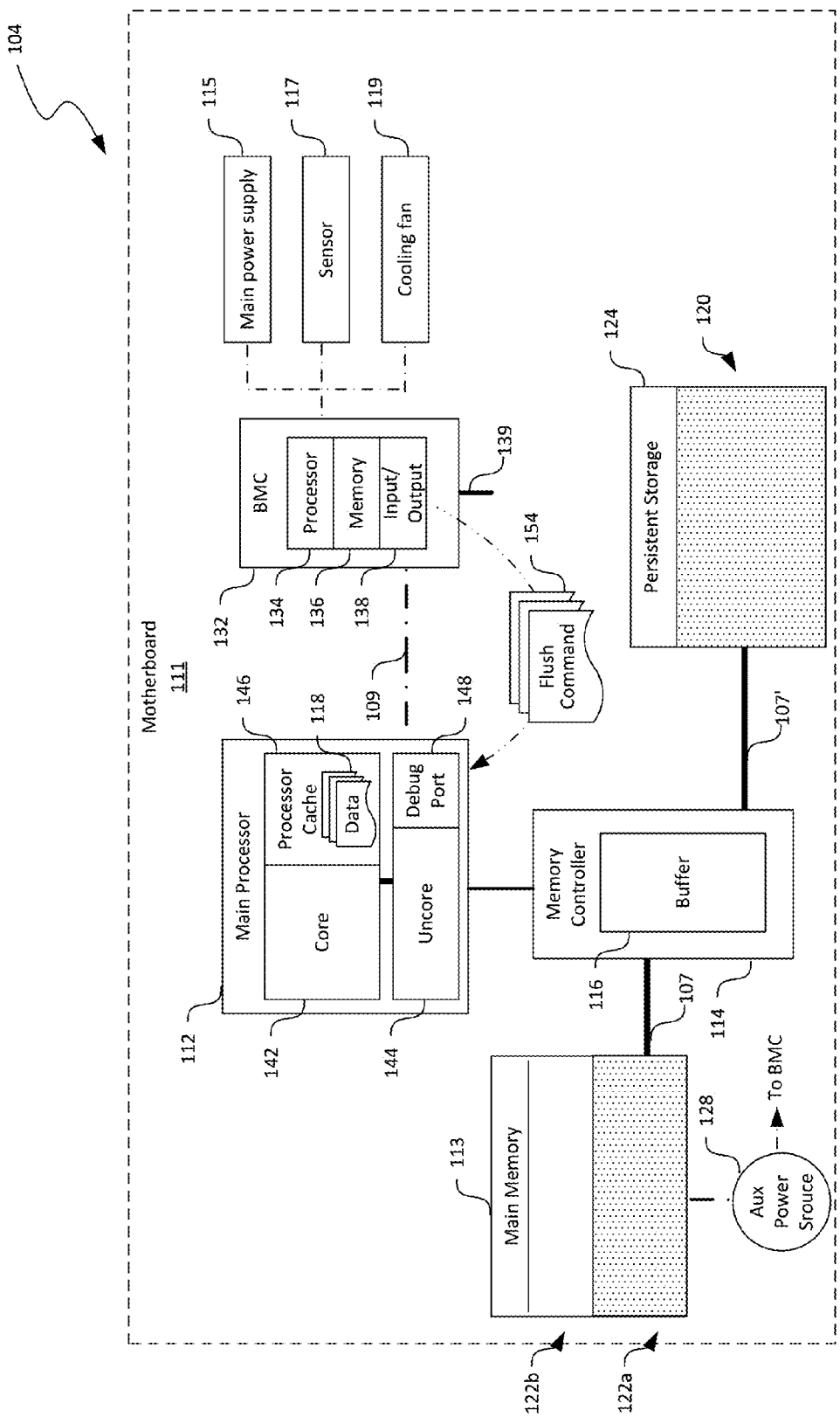

As shown in FIG. 2B, in response to receiving the failure notification 152 (FIG. 2A), the BMC 132 can issue a flush command 154 to the uncore 144 via the debug port 148 and the debug bus 109. The flush command 154 can include one or more instructions such as read memory, read memory block, read control register, or other suitable instructions from the BMC 132. The one or more instructions can cause the uncore 144 to copy the data 118 from the processor cache 146 to the main memory 113, as described in more detail below with reference to FIG. 2C.

Figure 2C:
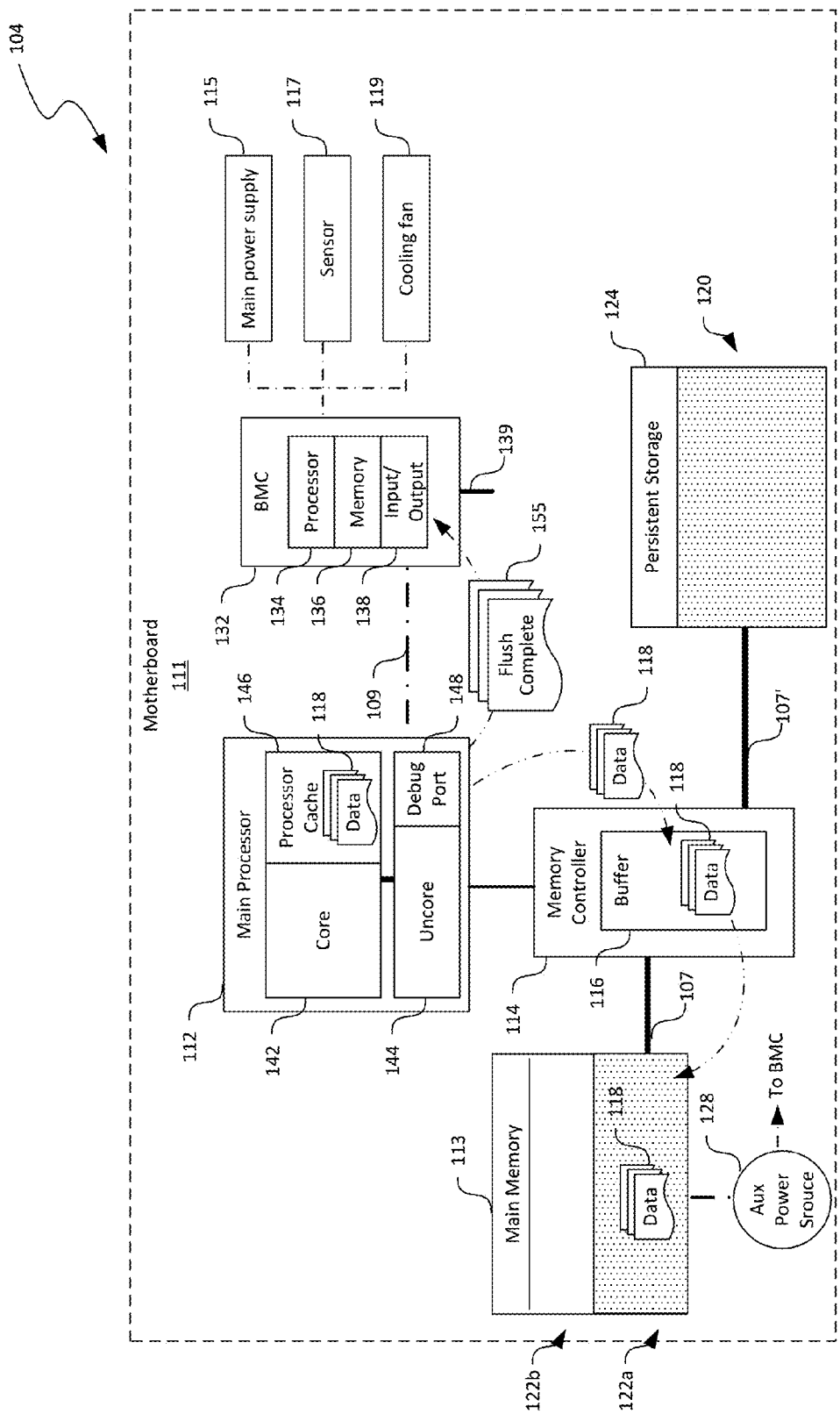

As shown in FIG. 2C, in response to receiving the flush command, the uncore 144 can cause the memory controller 114 to copy some or all data 118 in the processor cache 146 to the buffer 116 in the memory controller 114. In certain embodiments, only a portion of the data 118 can be copied. For example, only data 118 in L1 or L2 cache can be copied but not data 118 in L3 cache. In another example, data 118 with a residence time lower than a threshold can be copied. In other embodiments, all data 118, for instance, from L1, L2, and L3 cache can be copied. The memory controller 114 can then transmit the data 118 to the first portion 122b of the main memory 113. The uncore 144 can continue to monitor the data copying operation until a target portion of or all data 118 from the processor cache 146 has been copied to the main memory 113. In response to determining that all data 118 has been copied to the main memory 113, the uncore 144 can then transmit a notification of flush complete 155 to the BMC 132 via the debug port 148, the pin 139, or other suitable communication channels.

Figure 2D:
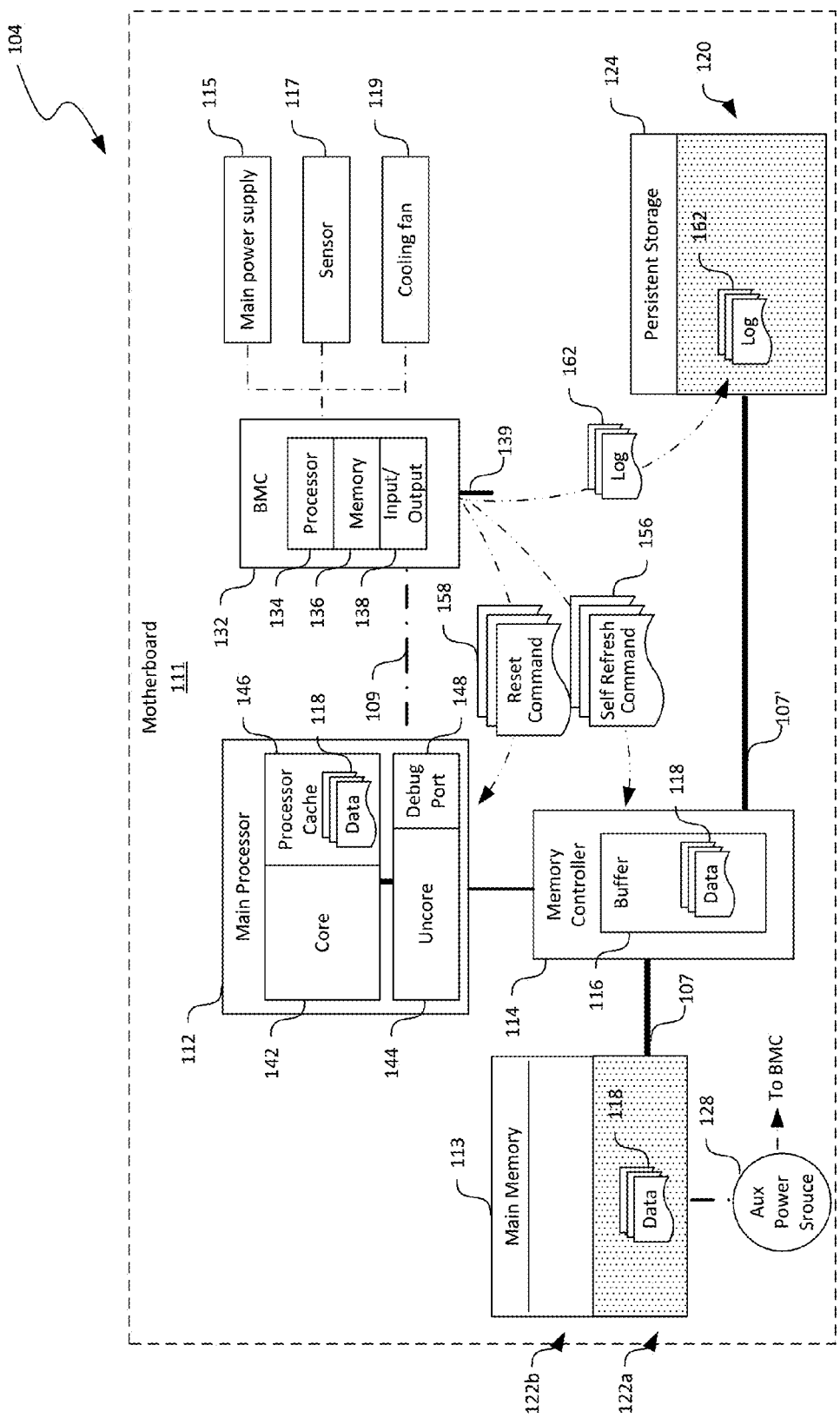

As shown in FIG. 2D, in response to receiving the flush complete 155, the BMC 132 can issue a reset command 158 to the uncore 144 via the debug port 148 and generate or update a log file 162 in the persistent storage 124 indicating the catastrophic failure experienced by the core 142 or other suitable events. The reset command 158 causes the uncore 144 to perform a reset sequence on the core 142. The reset sequence can include powering down, power up, re-initialize the processor cache 146, and/or other suitable operations. The BMC 132 can also issue a self-refresh command 156 to the memory controller 114 to put the main memory 113 or at least the first portion 122a of the main memory 113 in a self-refresh mode. In the self-refresh mode, the main memory 113 or the first portion thereof can be independently refreshed from the main power supply 115 or the auxiliary power source 128 instead of the memory controller 114.

Figure 2E:
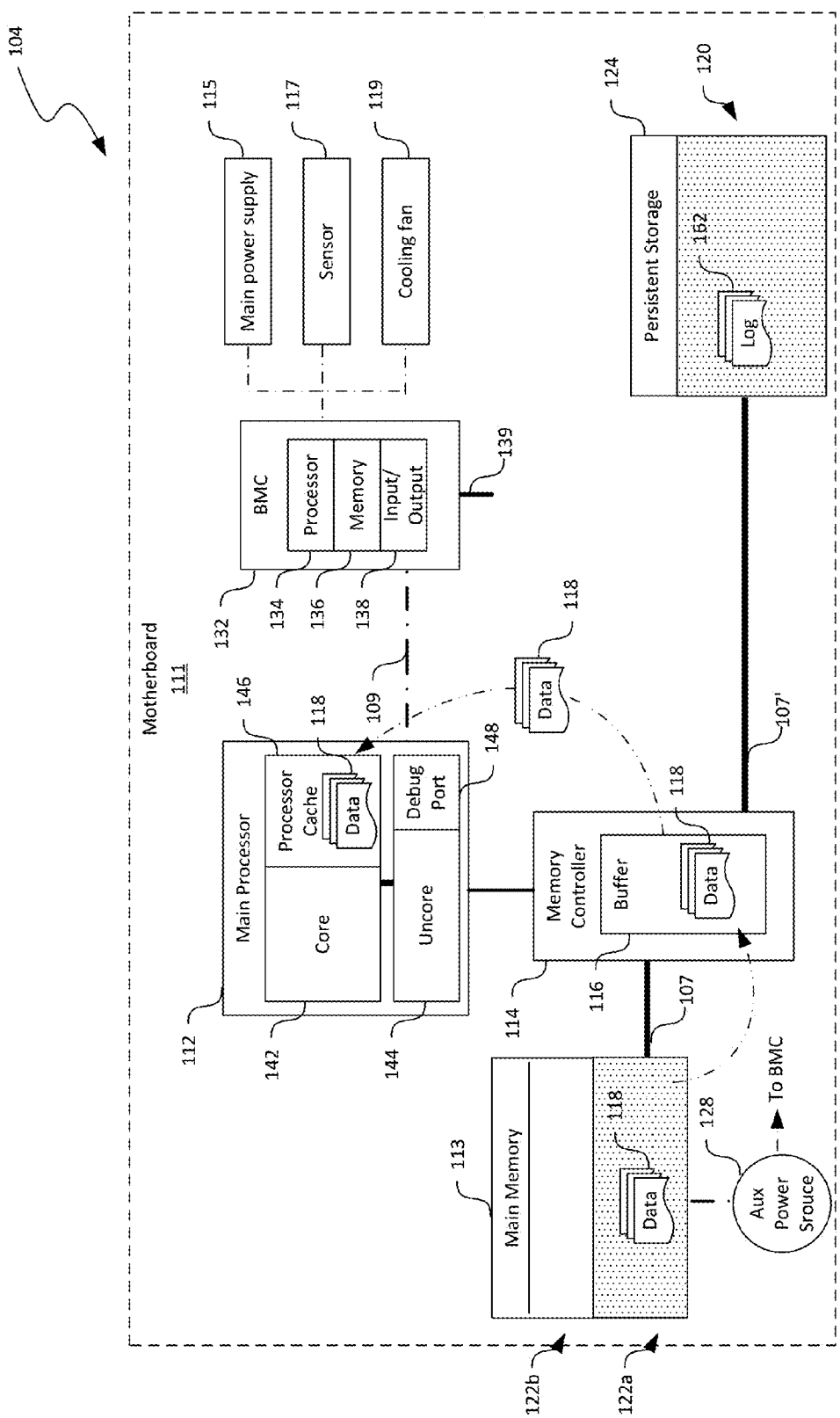

FIG. 2E shows an operating stage at which the computing unit 104 is being reset. As shown in FIG. 2E, during reset, the BIOS and/or operating system of the computing unit 104 can access the log file 162 and determine whether the reset is a normal reset or one due to a catastrophic failure of the main processor 112. In response to determining that the reset is due to a catastrophic failure of the main processor 112, the BIOS and/or operating system can copy the data 118 in the main memory 113 to the buffer 116 in the memory controller 114, and then to the processor cache 146. During reset, the data 118 in the first portion 122a of the main memory 113 can be maintained by not undergoing re-initialization. As such, the data 118 (FIG. 2A) residing in the processor cache 146 when the main processor 112 experiences a catastrophic failure can be recovered. Thus, data loss due to catastrophic failures in the main processor 112 can be reduced.

Even though the persistence operations are described above via execution of instructions by processor 134 of the BMC 132, in certain embodiments, an axillary processor (not shown) can be used to execute the corresponding instructions in lieu of or in addition to the processor 134 of the BMC 132. In further embodiments, the enclosure controller 105 can be configured to perform the foregoing operations in lieu of or in addition of the processor 134 of the BMC 132.

Figure 3:
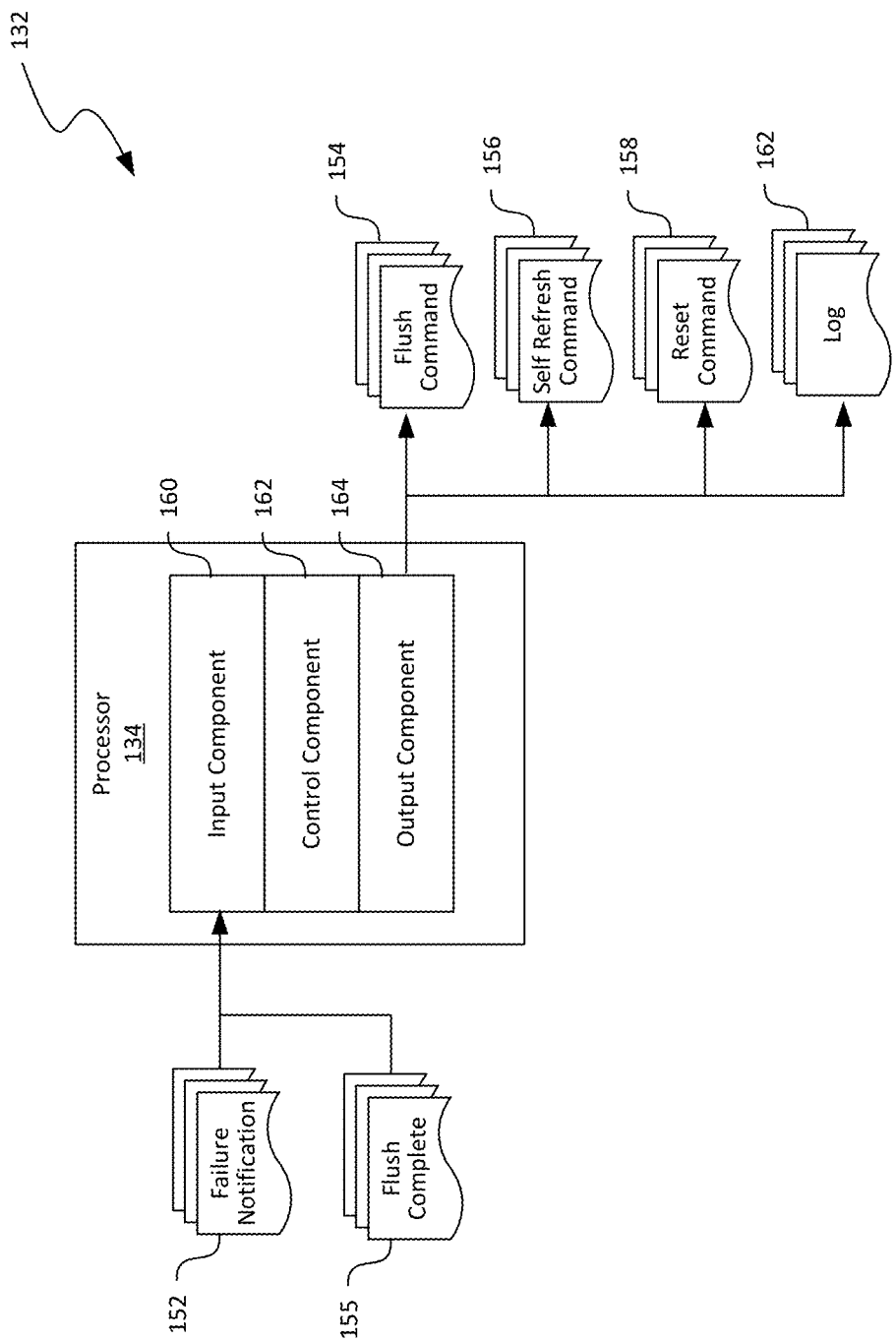
FIG. 3 is a block diagram showing software modules suitable for the main processor of FIGS. 2A-2E in accordance with embodiments of the present technology.

FIG. 3 is a block diagram showing certain computing system components suitable for the processor 134 of the BMC 132 in FIGS. 2A-2E in accordance with embodiments of the disclosed technology. In FIG. 3 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the processor 134 of the BMC 132 can execute instructions to provide an input component 160, a control component 162, and an output component 164. Even though particular components are shown in FIG. 3, in other embodiments, the processor 134 can also provide counter components, timer components, or other suitable types of components.

The input component 160 can be configured to receive a failure notification 152 from the main processor 112 (FIG. 2A). In certain embodiments, the input component 160 can receive the failure notification 152 and the flush complete 155 as a voltage, current, or other suitable types of input signals at the pin 139 (FIG. 2A) or via other suitable communication channels. In response, the input component 160 can be configured to recognize the input signal and convert the input signal to a binary value or other suitable types of value. The input component 160 can then provide the converted input signal to the control component 162 for further processing. The output component 164 can be configured to format, validate, and transmit various commands to the uncore 144, the memory controller 114, or other components of the computing unit 104.

The control component 162 can be configured to issue a set of commands via the output component 164 to effect an out-of-band data recovery from the processor cache 146 (FIG. 2A). For example, as shown in FIG. 3, the control component 162 can initially issue a flush command 154 to the uncore 144 of the main processor 112 via the debug port 148. The flush command 154 causes the uncore 144 to copy any data 118 (FIG. 2A) in the processor cache 146 to the first portion 122a (FIG. 2A) of the main memory 113. Upon receiving the notification of flush complete 155, the control component 162 can be configured to issue a self-refresh command 156 to the memory controller 114 to cause the main memory 113 or at least the first portion 122a to be in a self-refresh mode.

The control component 162 can also be configured to issue a reset command 158 to the uncore 144 of the main processor 112 to reset the core 142 and generate/update a log file 162 in the persistent storage 124 (FIG. 2A) indicating that the reset is caused by a catastrophic failure of the core 142. Additional functions of the various components of the various components of the processor 134 of the BMC 132 are described in more detail below with reference to FIGS. 4-6.

Figure 4:
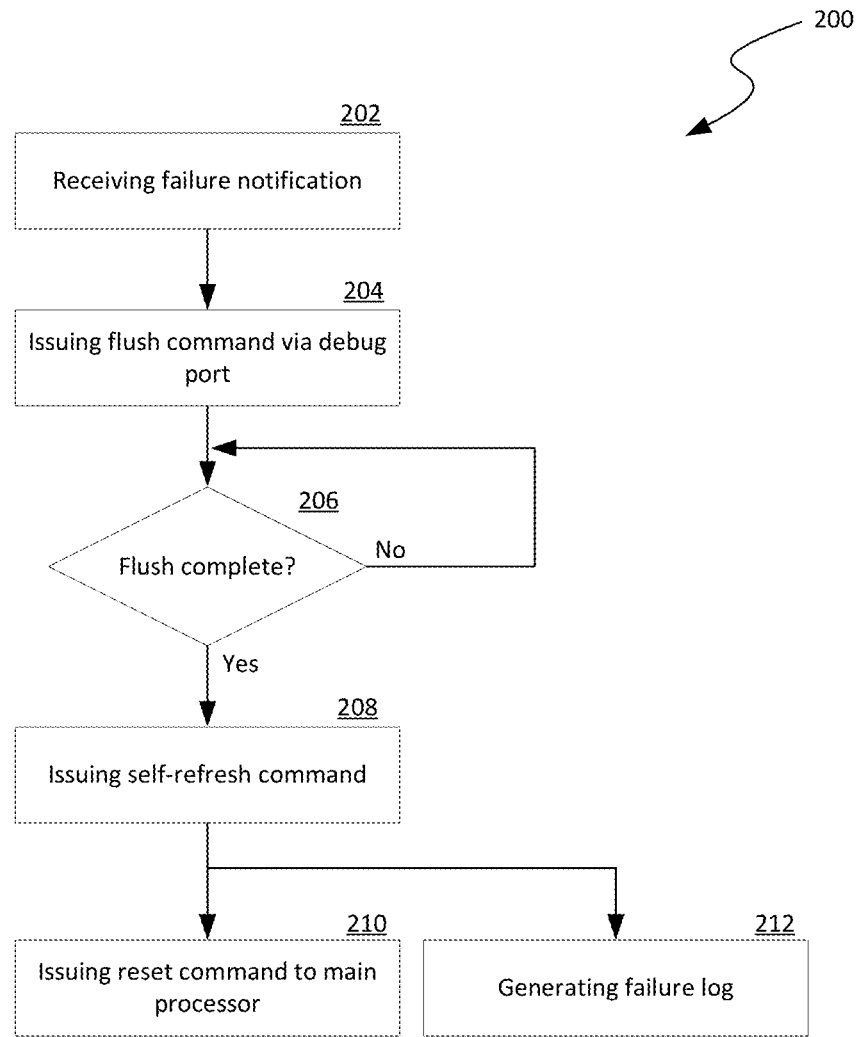
FIGS. 4-6 are flow diagrams illustrating various aspects of processes for ensuring data integrity during backup operations in accordance with embodiments of the present technology.

FIG. 4 is a flow diagram illustrating a process 200 for implementing out-of-band data recovery in accordance with embodiments of the present technology. Even though the process 200 and other processes are described below with reference to the computing system 100 in FIG. 1 and the computing unit 104 in FIGS. 2A-2E, several embodiments of the process 200 may also be used in other computer systems or devices.

As shown in FIG. 4, the process 200 can include receiving a failure notification of a main processor at stage 202. The failure notification indicates that the main processor has experienced a catastrophic failure and cannot execute instructions. The process 200 can then include issuing a flush command to an uncore of the main processor via a debug port of the main processor at stage 204. The flush command can include one or more instructions to copy any data currently residing in a processor cache of the main processor to a main memory. The process 200 can then include a decision stage 206 to determine whether data flush from the processor cache to the main memory is completed. In one embodiment, the data flush is completed when a flush complete notification is received. In other embodiments, the data flush can be determined to be completed based on an elapsed time or other suitable criteria.

In response to determining that the data flush is not completed, the process 200 reverts to checking whether the data flush is completed. In response to determining that the data flush is completed, the process 200 proceeds to issuing a self-refresh command to cause the main memory or a portion thereof to be in a self-refresh mode at stage 208. When the main memory is in the self-refresh mode, any data residing in the main memory is retained and not modified. The process 200 can then include issuing a reset command to reset the main processor at stage 210 and generating a failure log accessible to a BIOS and/or operating system of the computing unit at stage 212.

Figure 5:
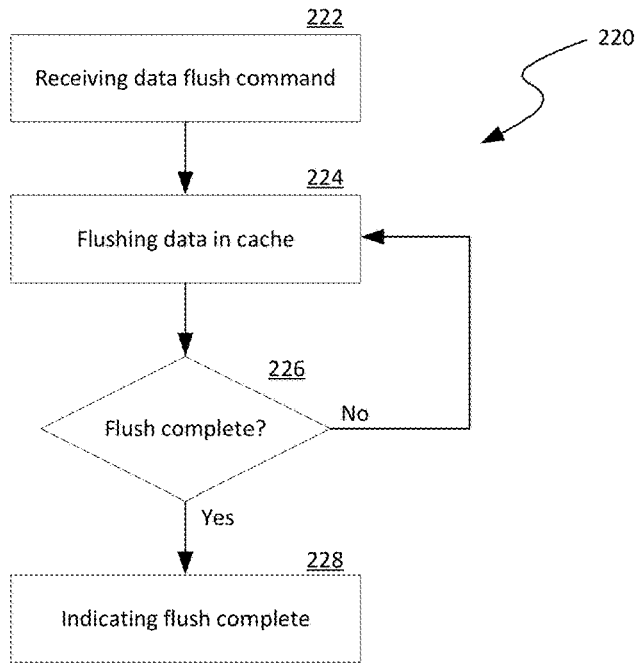

FIG. 5 is a flow diagram illustrating a process 220 for implementing data flush from a processor cache to a main memory in accordance with embodiments of the present technology. As shown in FIG. 5, the process 220 can include receiving a data flush command via a debug port at stage 222. In response to the received data flush command, the process 220 can include flushing or copying data in a processor cache to a main memory at stage 224. The process 222 can then include a decision stage 226 to determine whether the data flush is completed. In response to determining that the data flush is not completed, the process 222 reverts to flushing data in the processor cache at stage 224. In response to determining that the data flush is completed, the process 220 can include indicating, for example, to a BMC that the data flush is completed at stage 228.

Figure 6:
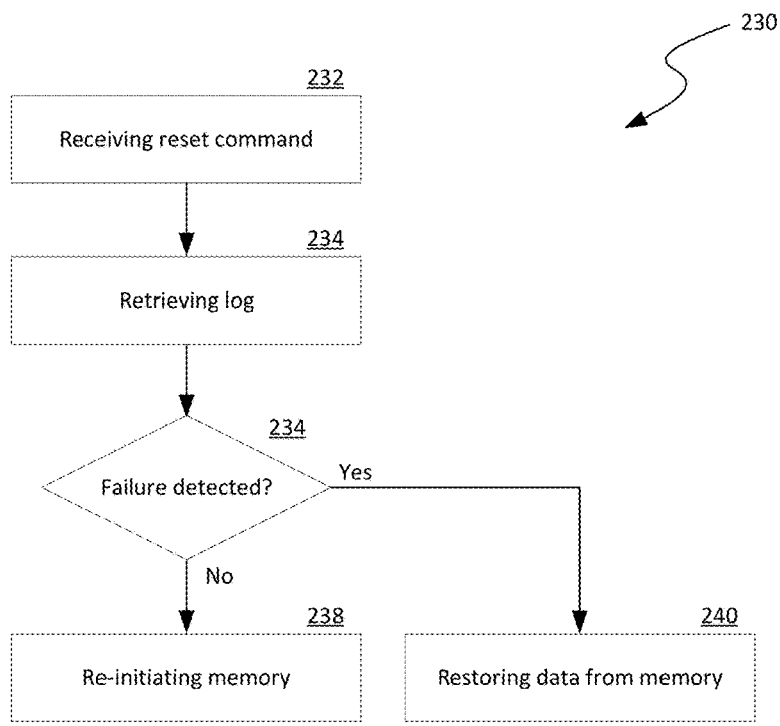

FIG. 6 is a flow diagram illustrating a process 230 for a reset in a main processor in accordance with embodiments of the present technology. As shown in FIG. 6, the process 230 can include receiving a reset command at stage 232. The process 234 can then include retrieving a log file from a persistent storage at stage 234. The log file can include entries identifying catastrophic failures experienced by the main processor. The process 230 can then include a decision stage 234 to determine whether the reset command is a result of a catastrophic failure of the main processor. In response to determining that the reset command is a result of a catastrophic failure of the main processor, the process 230 can include restoring data from the main memory to the processor cache at stage 240. The restored data can be maintained in the main memory (or a portion thereof) by not undergoing re-initialization during rest. In response to determining that the reset command is not a result of a catastrophic failure of the main processor, the process 230 can include re-initiating the main memory at stage 238.

Figure 7:
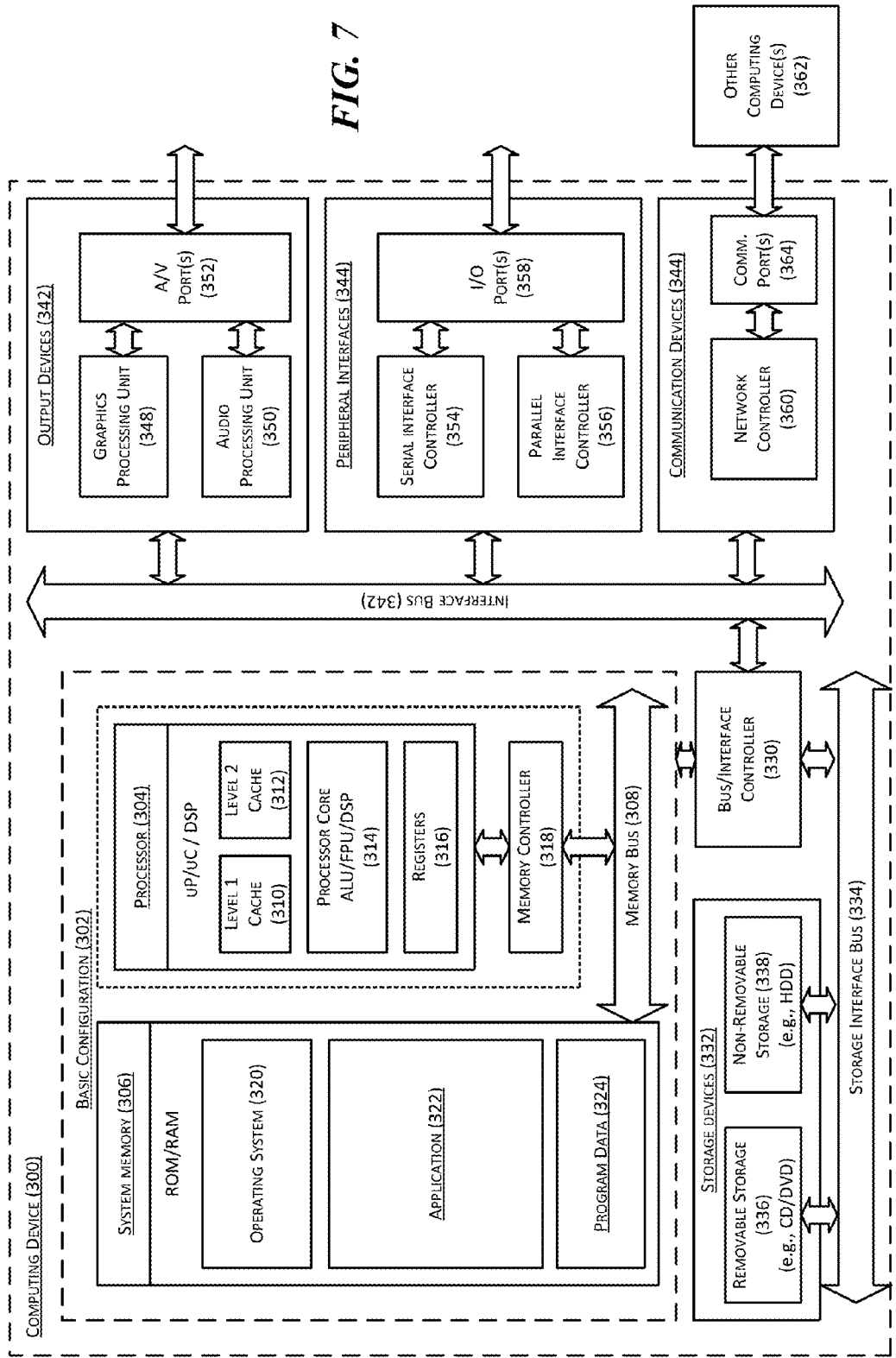
FIG. 7 is a computing device suitable for certain components of the computing system in FIG. 1.

FIG. 7 is a computing device 300 suitable for certain components of the computing system 100 in FIG. 1, for example, the computing unit 104 or the client device 103. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one or more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A computing device, comprising:
   a main processor having a core, an uncore having a debug port, and a processor cache;
   a volatile memory operatively coupled to the main processor; and
   a baseboard management controller having a processor and memory containing instructions executable by the processor to cause the processor to perform a process comprising:
      receiving, at the baseboard management controller, a failure notification indicating that the core of the main processor is experiencing a catastrophic failure causing the core unable to execute instructions;
      issuing, from the baseboard management controller, a flush command to the uncore of the main processor via the debug port, the flush command instructing the uncore to copy any data currently residing in the processor cache of the main processor to the volatile memory; and
      in response to receiving a notification indicating that the data currently residing in the processor cache is copied to the volatile memory, issuing a self-refresh command causing the volatile memory to enter a self-refresh mode in which the data copied from the processor cache is maintained and unmodifiable by the main processor during a reset of the main processor.

2. The computing device of claim 1 wherein the baseboard management controller includes a pin, and wherein receiving the failure notification includes receiving a voltage or current input signal from the uncore at the pin of the baseboard management controller, the input signal indicating that the core of the main processor is experiencing a catastrophic failure causing the core unable to execute instructions.

3. The computing device of claim 1 wherein issuing the flush command includes issuing the flush command to be executed by the uncore without impacting execution of instructions or modifying the data in the processor cache by the core of the main processor.

4. The computing device of claim 1 wherein the computing device further includes a memory controller configured to refresh the volatile memory, and wherein issuing the self-refresh command includes issuing the self-refresh command to the memory controller, the self-refresh command instructing the memory controller to stop refreshing the volatile memory.

5. The computing device of claim 1 wherein the computing device further includes a memory controller configured to refresh the volatile memory, and wherein issuing the self-refresh command includes issuing the self-refresh command to the memory controller, the self-refresh command instructing the memory controller to stop refreshing the volatile memory and allow the volatile memory to self-refresh by drawing power from a main power source or an auxiliary power source of the computing device.

6. The computing device of claim 1 wherein the computing device further includes a persistent storage, and wherein the process performed by the processor further includes generating a log file in the persistent storage, the log file being accessible by a basic input/output system of the computing device and containing data indicating that the catastrophic failure in the core of the main processor.

7. The computing device of claim 1 wherein the computing device further includes a persistent storage, and wherein the process performed by the processor further includes:
   issuing, from the baseboard management controller, a reset command to the uncore to reset the core of the main processor; and
   generating a log file in the persistent storage, the log file being accessible by a basic input/output system of the computing device, wherein the log file containing data indicating that the reset is a result of the catastrophic failure in the core of the main processor.

8. The computing device of claim 1 wherein the processor cache includes L1 and L2 cache, and wherein the flush command instructs the uncore to copy any data currently residing in the L1 and L2 cache to the volatile memory.

9. A method performed in a computing device having a processor, a volatile memory, and a baseboard management controller operatively coupled to one another, the processor having a core, an uncore with a debug port, and a processor cache associated with the core, the method comprising:
   receiving, at the uncore, a flush command from the baseboard management controller via the debug port when the core experiences a catastrophic failure that renders the core unable to execute instructions, the flush command instructing the uncore to copy any data currently residing in the processor cache to the volatile memory;
   in response to receiving the flush command, copying data currently residing in the processor cache to the volatile memory;
   transmitting a notification to the baseboard management controller indicating that data copying from the processor cache to the volatile memory is completed; and
   resetting the core in response to receiving a reset command from the baseboard management controller issued in response to the transmitted notification indicating that data copying from the processor cache to the volatile memory is completed.

10. The method of claim 9, further comprising:
    detecting the catastrophic failure in the core; and
    in response to the detected catastrophic failure, notifying the baseboard management controller that the core experiences the catastrophic failure.

11. The method of claim 9, further comprising:
    detecting the catastrophic failure in the core; and
    in response to the detected catastrophic failure, activating an input signal to a pin of the baseboard management controller, the input signal notifying the baseboard management controller that the core experiences the catastrophic failure.

12. The method of claim 9, further comprising executing the flush command by the uncore independent of any operations performed by the core of the processor.

13. The method of claim 9, further comprising:
    determining whether data copying from the processor cache to the volatile memory is completed; and
    in response to determining that data copying from the processor cache to the volatile memory is completed, transmitting the notification to the baseboard management controller indicating that data copying from the processor cache to the volatile memory is completed.

14. A method performed in a computing device having a main processor, a volatile memory, and a baseboard management controller operatively coupled to one another, the main processor having a core, an uncore with a debug port, and a processor cache associated with the core, the method comprising:

receiving, at the baseboard management controller, a failure notification indicating that the core of the main processor is experiencing a catastrophic failure causing the core unable to execute instructions;

issuing, from the baseboard management controller, a flush command to the uncore of the main processor via the debug port of the main processor, the flush command instructing the uncore to copy any data currently residing in the processor cache of the main processor to the volatile memory; and in response to receiving a notification indicating that the data currently residing in the processor cache is copied to the volatile memory, issuing a self-refresh command causing the volatile memory to enter a self-refresh mode in which the data copied from the processor cache is maintained and unmodifiable by the main processor during a reset of the main processor.

15. The method of claim 14 wherein the baseboard management controller includes a pin, and wherein receiving the failure notification includes receiving a voltage or current input signal from the uncore at the pin of the baseboard management controller, the input signal indicating that the core of the main processor is experiencing a catastrophic failure causing the core unable to execute instructions.

16. The method of claim 14 wherein issuing the flush command includes issuing the flush command to be executed by the uncore without impacting execution of instructions or modifying the data in the processor cache by the core of the main processor.

17. The method of claim 14 wherein the computing device further includes a memory controller configured to refresh the volatile memory, and wherein issuing the self-refresh command includes issuing the self-refresh command to the memory controller, the self-refresh command instructing the memory controller to stop refreshing the volatile memory.

18. The method of claim 14 wherein the computing device further includes a memory controller configured to refresh the volatile memory, and wherein issuing the self-refresh command includes issuing the self-refresh command to the memory controller, the self-refresh command instructing the memory controller to stop refreshing the volatile memory and allow the volatile memory to self-refresh by drawing power from a main power source or an auxiliary power source of the computing device.

19. The method of claim 14 wherein the computing device further includes a persistent storage, and wherein the method further includes generating a log file in the persistent storage, the log file being accessible by a basic input/output system of the computing device and containing data indicating that the catastrophic failure in the core of the main processor.

20. The method of claim 14 wherein the computing device further includes a persistent storage, and wherein the method further includes:

issuing, from the baseboard management controller, a reset command to the uncore to reset the core of the main processor; and generating a log file in the persistent storage, the log file being accessible by a basic input/output system of the computing device, wherein the log file containing data indicating that the reset is a result of the catastrophic failure in the core of the main processor.

* * * * *